United States Patent
Kindem et al.

(10) Patent No.: US 7,019,783 B2
(45) Date of Patent: Mar. 28, 2006

(54) CHARGE PUMP POWER SUPPLY WITH NOISE CONTROL

(75) Inventors: Joel Kindem, San Diego, CA (US); Lars S. Carlson, San Diego, CA (US)

(73) Assignee: Digirad Corporation, Poway, CA (US)

( * ) Notice: Subject to any disclaimer, the term of this patent is extended or adjusted under 35 U.S.C. 154(b) by 0 days.

(21) Appl. No.: 10/958,689

(22) Filed: Oct. 4, 2004

(65) Prior Publication Data

US 2005/0157193 A1    Jul. 21, 2005

Related U.S. Application Data

(60) Provisional application No. 60/508,432, filed on Oct. 2, 2003.

(51) Int. Cl.
   *H04N 5/225* (2006.01)

(52) U.S. Cl. .................. 348/372; 348/294; 348/241

(58) Field of Classification Search ............... 348/372
   See application file for complete search history.

(56) References Cited

U.S. PATENT DOCUMENTS

| | | | |
|---|---|---|---|
| 4,979,035 A * | 12/1990 | Uehara et al. ............... 348/76 |
| 5,278,656 A | 1/1994 | Hynecek et al. | |
| 6,518,559 B1 * | 2/2003 | Endo et al. .............. 250/208.1 |
| 6,525,614 B1 | 2/2003 | Tanimoto | |
| 6,798,274 B1 * | 9/2004 | Tanimoto .................... 327/536 |
| 6,882,370 B1 * | 4/2005 | Ishimoto .................... 348/372 |
| 2002/0053942 A1 | 5/2002 | Tanimoto | |

* cited by examiner

*Primary Examiner*—Tuan Ho
(74) *Attorney, Agent, or Firm*—Fish & Richardson P.C.

(57) ABSTRACT

An embedded power supply for providing a voltage on a detector module within an imaging system provides the required potential to the module from charge stored on an output capacitor. Charge on the capacitor is replenished by injecting, commonly referred to as pumping, current into the capacitor by pulses of current generated by switching mode circuitry. Charge pumping into the capacitor is efficient because energy is stored in low-loss passive components and transferred into the low-loss output capacitor through low-impedance paths. Switching noise of the power supply is eliminated by turning off the charge pumping circuit during periods when such noise would disrupt the operation of the module, for example when the module is reading out image data. The output capacitor is large enough to supply the required voltage to the module for a certain period when the capacitor is not being pumped.

26 Claims, 2 Drawing Sheets

CHARGE PUMP POWER SUPPLY WITH NOISE CONTROL

CROSS-REFERENCE TO RELATED APPLICATION

This application claims benefit of the priority of U.S. Provisional Application Ser. No. 60/508,432 filed Oct. 2, 2003 and entitled "Charge Pump Power Supply with Noise Control," the disclosure of which is herewith incorporated by reference.

BACKGROUND

An exemplary imaging system may be composed of four basic subsystems: (1) one or a plurality of detector modules 100 that capture the raw signals and may perform some signal processing, (2) an image processing subsystem 110 that converts the information from the detector modules 100 into a form suitable for further processing in a computer, (3) a processing part 120 that receives the data from the signal processing subsystem 110, then generates and may enhance one or a plurality of final images and may also calculate the values of attributes of the object imaged, and (4) one or a plurality of output devices 130 such as computer monitors and printers that present the final images and other data in desired formats.

Some imaging modules may require a power supply voltage that is different than the input voltage. This different voltage may be generated on the module itself. There may be many reasons to generate the voltage within the module, including reduction of the number of power supply lines, reduction of coupling of noise into the system by the secondary power lines, as well as reduction of fixed pattern noise caused by differing voltage drops on different lines.

The production of voltages on the chip, however, may itself create noise. That noise may degrade the received image.

SUMMARY

The present disclosure describes a power supply for providing a secondary voltage on an image detector module using a specialized switching power supply with reduced noise effect on the final image. This is done according to the present system by using a "switching" type power supply that operates only during times when specified image-acquiring processes are not being carried out. The power supply operates during times when the system is less sensitive to the noise being produced. One embodiment of such a switching power supply uses a charge pump that stores the created voltage/charge into a capacitor, that is sized to maintain the power during times when the power supply is not operating.

DESCRIPTION OF DRAWINGS

These and other features and advantages of the invention will become more apparent upon reading the following detailed description and upon reference to the accompanying drawings.

DETAILED DESCRIPTION

An embodiment operates by generating secondary voltages directly on a detector module 100 that can operate free of switching noise for a certain period while the module 100 is performing noise-sensitive operations such as acquiring detector data.

The embodiment describes use with gamma ray imaging modules. However, this technique may be used in other applications, and specifically in any application where images are acquired.

Gamma ray imaging modules 100 commonly employ p-i-n photodiodes for direct detection of gamma rays or for indirect detection, in which photodiodes detect light emitted from scintillators in response to illumination by gamma rays. Such photodiodes typically operate under reverse bias voltages ranging up to 100 volts or more. The current drain of a module 100 on the reverse bias line is small—typically a fraction of one microampere, and relatively insensitive to the value of the reverse bias.

The signals detected by the photodiodes in a gamma ray imaging module 100 are very small—of rough order of magnitude one femtocoulomb per gamma ray detected. Accordingly, the gamma ray module 100 should detect signals under conditions of the minimum possible electromagnetic noise. Therefore any power supply operating on the module must be as noise-free as possible while the image data is being acquired.

Figure 1:
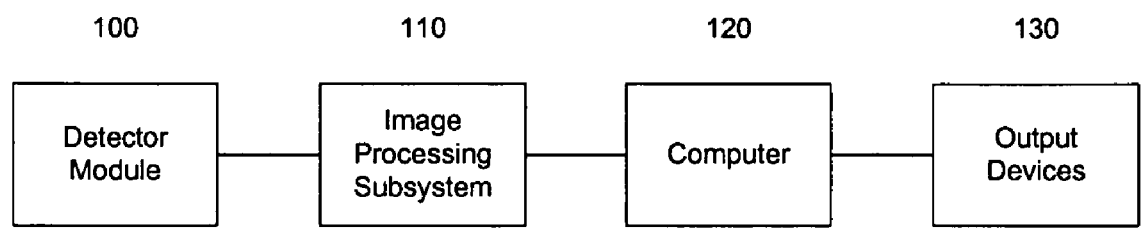
FIG. 1 shows a block diagram of an imaging system comprising four subsystems.
Figure 2:
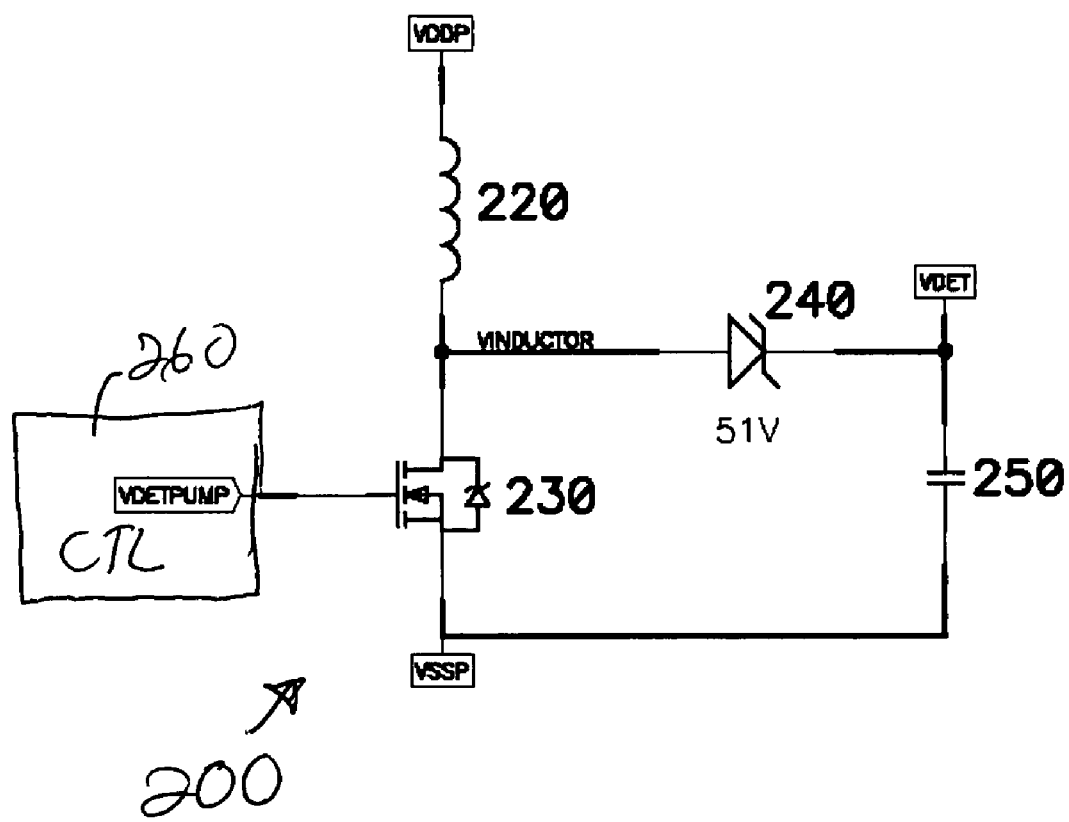
FIG. 2 presents a schematic diagram of an embodiment of a power supply used on a chip, according to this system.

The embodiment is shown in FIG. 2. The power supply 200 is a switched power supply. Power is produced by switching the supply of charge to a charge storage part between on and off. In the embodiment of FIG. 2, the power is stored on an output capacitor 250. Charge on the capacitor 250 is replenished by injecting current into the capacitor using pulses of current, generated by switching mode circuitry, here shown as FET 230, and inductor 220.

Switching noise of the power supply is reduced or eliminated during periods when such noise would disrupt the operation of the module. This reduction is carried out by turning off the switching circuit during these times. This reduces or eliminates the noise produced by that switching circuit. This imaging device may acquire images for specified portions of the operation time, and/or may process those images during that time.

In this embodiment, the output capacitor is selected to be large enough to supply the required voltage to the module for a certain period when the capacitor is not being pumped. The power supply may be off for 10 times as long as it is on, or more. Hence the capacitor may be larger in power storage capability then a comparable capacitor in other kinds of comparable power supplies.

More generally, the power supply of FIG. 2 is a charge pump type of switching power supply, and has two basic sections: output capacitor 250 and a charge pumping circuit. Output voltage and current are supplied from charge stored on output capacitor 250. Charge on output capacitor 250 is replenished by the charge pumping circuit comprised of inductor 220, normally-off transistor 230 and Zener diode 240.

The lines labeled VDDP and VSSP supply primary power to the circuit. VSSP is usually called a reference potential. The magnitudes and polarities of all voltages are taken with respect to VSSP.

A charge pump power supply may provide a voltage of approximately 50 to 60 volts at the terminal labeled VDET. This terminal supplies the reverse bias for the photodiodes on the gamma ray imaging module 100.

In the implementation shown, VDDP and the output voltage VDET are described as being positive with respect to VDDP. The same techniques can, however, be applied to implementations in which the polarity of VDDP is reversed or the polarity of VDET is reversed or the polarities of both VDDP and VDET are reversed, as would be understood by those having ordinary skill in the art.

The charge pumping circuit maintains charge on output capacitor 250. A controller 260 produces pumping pulses to the base of the transistor 230. The controller can simply be formed of discrete components, such as capacitors and inductors, or may be more complex, such as a microprocessor.

During pumped operation of the circuit implementation shown, positive-going pulses are applied to the gate of normally off transistor 230 via the line labeled VDETPUMP, turning the transistor on and causing current to flow from VDDP to VSSP through inductor 220 and transistor 230. At the end of each pulse, transistor 230 turns off, interrupting current flow through inductor 220. In response to this interruption, the inductor produces a voltage spike on the circuit node labeled VINDUCTOR. This spike is positive with respect to VDDP. During the period when the potential VINDUCTOR is more positive than VDET, Zener diode 240 conducts current in the forward direction from the node labeled VINDUCTOR into capacitor 250, increasing the charge stored on capacitor 250 and the magnitude of VDET. When the potential VINDUCTOR is no longer more positive than VDET, the Zener diode stops conducting in the forward direction.

Following the end of the voltage spike on the node labeled VINDUCTOR, if VDET is more positive than VDDP added to the reverse breakdown voltage of the Zener diode 240, 51 volts in the embodiment shown, the Zener diode will conduct current in the reverse direction through inductor 220 from VDET to VSSP. Therefore, this component has the effect of limiting the maximum value of potential VDET to the sum of VDDP and the reverse breakdown voltage of Zener diode 220. Other forms of voltage regulation may alternatively be used.

The power supply of this embodiment is efficient. In the embodiment shown, except for the brief period when transistor 230 is switching between its off and on states, current flows through one or more low-loss components such as inductor 220 and its small parasitic resistance, transistor 230 and its small on-state resistance, Zener diode 240 and its low forward series resistance and low reverse series resistance when the reverse bias exceeds the breakdown voltage, also referred to as the Zener voltage, and capacitor 250, which has a high shunt resistance.

The power supply described generates electromagnetic switching noise during intervals of charge pumping during either or both of two conditions: (a) when the current in inductor 220 is changing and/or (b) when capacitor 250 is being charged. This noise could adversely affect data collected or being processed during these intervals, especially when the data are low-level signals such as the photocurrent of the photodiodes and the signals in the first level of amplification and discrimination of these currents.

The power supply is operated with no switching noise during periods of image acquisition, e.g., image signal collection and image signal processing by using the controller 260 to stop the charge pumping process during these intervals. During the stop time, the line VDETPUMP is held low, thereby maintaining transistor 230 in the off state. During these quiescent periods, capacitor 250 maintains its stored charge, and maintains the voltage VDET so long as the stored charge lasts. Bias current is supplied to the photodiodes from the charge in the capacitor. However, VDET will decrease steadily during these periods. The size of capacitor 250 is preferably selected to limit the extent of the decrease of VDET during quiescent periods to an acceptable value, e.g., to prevent the voltage VDET from reducing by more than 5% or 10% or some other number. Further filtering can be added at the output VDET to further minimize switching transients on this node during the pumping phase. For example, small value capacitors (e.g., 0.1 uF or 0.01 uF, or both) may be used as decoupling capacitors.

Power supplies in other embodiments may employ other circuit layouts. For example, a plurality of switched capacitors may be used to pump charge onto an output capacitor, rather than employing a switched inductor. As in the embodiment shown, pumping circuits employing switched capacitors can be efficient, because energy is stored on low loss passive elements and flows through low impedance paths.

The component values and the frequency and duration of the pulses of VDETPUMP may be selected so that the period of time required for charge pumping is small (e.g., 1/10, or less) compared to the required length of the quiescent periods.

Invalid data collected or processed during periods of charge pumping can be purged by filtering data generated during this period. Such filtering may be performed in software, hardware or firmware, singly or in any combination. Determining when to disable the function of charge pumping or when to filter invalid data can be accomplished, for example, by non-programmable or programmable circuitry (such as a microcontroller). The same controller may also perform the functions of controller 260.

In a detector module 100 with an embodiment of a power supply, the VDETPUMP signal may be generated on the module 100 and one or both of Tpump, the duration of the pumping phase, and Tquiet, the duration of the quiet or non-pumping phase, may be determined by values stored in on-chip memory. Alternatively, one or both of these times could be determined by a synchronization signal generated off-chip. Use of such an external synchronization signal may be advantageous in systems with a plurality of detector modules 100 by permitting the system to control the readout interval for each module 100.

This circuit has been reduced to practice in a first embodiment within a gamma-ray detector module 100, approximately 2.5 cm wide, 5.0 cm long and 5.9 cm high (1 in×2 in×1.5 in). The module 100 includes two main PCB assemblies—a multichip module, or MCM, and a power/interface board, or PIB. The MCM comprises a plurality of segmented photodiode arrays, each segment forming a pixel which is associated with a corresponding segment, also forming a pixel, in a segmented scintillator array, a plurality of application specific integrated circuits, or ASICs, and a plurality of other minor components. When a signal gamma ray emitted from the patient or other subject being imaged is absorbed in a scintillator pixel, the scintillator material emits a flood of low-energy photons, typically in the near-UV to visible range of wavelengths. The corresponding photodiode pixel absorbs these photons, generating a photocurrent pulse that is injected into a corresponding input channel in a readout ASIC that determines if the total charge in the photocurrent pulse is within a range characteristic of a valid signal gamma ray. When such a valid photocurrent pulse is detected, the readout ASIC and one or more other ASICs on the MCM process the current pulse information and generate a plurality of output signals representing quantities such as the energy of the gamma ray detected and the position of the scintillator pixel that detected the gamma ray. Other embodiments may generate output signals for other quantities, such as a time associated with the detection of a gamma ray.

The PIB, connected to the MCM, comprises a charge pump power supply, or CPPS, according to this system, and an input/output interface system that receives power from external power supplies, distributes the external supply voltages and the internal supply voltage generated by the CPPS to the appropriate terminals of the MCM, and manages the input of control signals and output of data signals from the appropriate terminals on the MCM.

In this first embodiment, the CPPS was configured as shown in the circuit of FIG. 2, with approximate values of VDDP=3.5V, VSSP->0V (?), L=100 mH (the value of inductor 220), C=1 mF (the value of capacitor 250), Vz=51V (the reverse breakdown voltage or "Zener" voltage of Zener diode 240, type BZX84C51, and n-channel FET 230, type BSS123.

The VDETPUMP signal is generated by a microprocessor on the PIB, which forms the controller 260, as well as carrying out other image related functions. Pulse parameters such as number of pulses, width of pulses and pulse frequency were determined by values stored in the microprocessor.

During charge pumping, the VDETPUMP waveform was a train of 50 positive-going pulses of approximately 3.5V amplitude relative to VSSP, a pulse width of roughly 5 ms, a pulse rate of roughly 100 kHz. The total duration, Tpump, of the pulse train was roughly 500 ms. During signal acquisition, VDETPUMP was held near 0V for a quiescent period, Tquiet, of approximately 10 s. More generally, however, the pumping time, or time that the power supply is being charged, is preferably at least 10 times less than the time that the power supply is off.

During the quiescent period, VDET, the output of the CPPS, decreased by roughly 100 mV from its peak value of approximately 54V.

The module 100 of this first embodiment of the invention was tested under irradiation with 57 Co (cobalt-57) gamma rays of approximately 122 keV photon energy. During testing, we added a series resistor between the VDET terminal of the CPPS and the power input terminal of the MCM to provide additional output filtering to minimize the size of the transients on the MCM generated during pumping. Including these filter components, the total component count of the CPPS, including the VDETPUMP generator, is 6. There was no shielding between the CPPS and the MCM other than that provided by the metal traces and components comprising the MCM. There was no additional regulation beyond that provided by the Zener diode.

After providing this additional filtering, energy spectra, noise levels, and count rates from 57 Co irradiation taken with the module 100 described were well within the typical ranges for the same data taken with standard modules 100 that receive VDET from an external supply.

These test results demonstrate that charge pump power supplies in accordance with this invention are suitable for onboard generation of supply voltages for low-noise detector modules 100 for imaging systems without degrading the noise performance of such modules 100.

Because CPPS in accordance with this disclosure use a charge pumping method of voltage generation, they are inherently efficient in energy use.

In addition, these results also demonstrate that CPPS in accordance with this invention and with the attributes of (d) low component counts, (e) minimal shielding, (f) minimal filtration and (g) minimal regulation can generate said supply voltages for low-noise detector modules 100 for imaging systems without degrading the noise performance of such modules 100. Because of the small size of the module 100 of the practical embodiment, the small size of the CPPS was essential. A plurality of components such as the scintillator arrays, the MCM and cooling components occupy significant fractions of the volume of the module 100.

Each of the four attributes (d), (e), (f) and (g) above by itself lowers CPPS complexity and contributes to reduction of the size, weight, and cost of the CPPS and to increasing its reliability and manufacturing yield, thereby contribution to contributing to attainment of the corresponding objectives for the module 100 and system.

The output voltage, VDET, of a CPPS per this invention may be adjusted through selection of a Zener diode 240 with an appropriate Zener voltage, VZ, to optimize the performance of the associated module 100 itself or with respect to other modules 100 in a multi-module system.

A number of embodiments of the invention have been described. Nevertheless, it will be understood that various modifications may be made without departing from the spirit and scope of the invention. Accordingly, other embodiments are within the scope of the following claims. In addition, any modifications or substitutions that would be considered by one having ordinary skill in the art to be predictable, are intended to be encompassed within this disclosure.

For example, while the above describes the charge pump which operates using an inductor, a simple charge pump can simply operate using a transistor and capacitor. Moreover, while this describes an in-line zener diode for voltage regulation, and integrated circuit type regulator or no regulator at all can be used. Also, while this embodiment shows use of a FET, any transistor, or any switch for that matter can be used. The capacitor can be substituted by other comparable charge storage mechanisms, and may in fact comprise a bank of capacitors or the like.

All such modifications are intended to be encompassed within the following claims:

What is claimed is:

1. A method, comprising:
    operating an image sensor device in a way that acquires image information during a specified portion of an operation;
    driving at least a portion of said image sensor using a switched power supply which produces switching noise; and
    not operating said switched power supply during times when the image information is being acquired.

2. A method as in claim 1, further comprising image processing the image information, and not operating said switched power supply during times when said image processing is being carried out.

3. A method as in claim 1, further comprising storing power from a switched power supply, and using the stored power during said specified portion when the image information is being acquired.

4. A method as in claim 1, wherein said switched power supply comprises a charge pump.

5. A method as in claim 1, further comprising regulating the voltage from the switched power supply.

6. A method as in claim 5, wherein said regulating comprises limiting a voltage output from the switched power supply.

7. A method as in claim 2, wherein said operating an image sensor device comprises obtaining image information from the image sensor device.

8. A method as in claim 2, wherein said operating an image sensor device comprises acquiring gamma rays using a gamma ray camera.

9. A method as in claim 1, wherein said operating comprises turning on the switching by the power supply for a time less than 1/10 as long as a time when the power supply is switched off.

10. A system, comprising:
a switched power supply circuit including a controllable switch, which is turned on and off to respectively produce power output, and a power storage part, which stores the power from said power output;
an image sensor, which acquires image information during only a portion of its time of operation; and
a controller for said switched power supply, which controls said switched power supply to produce said power output only during a time when the image information is not being acquired.

11. An image sensor as in claim 10, further comprising an image processing module that image processes the image information, and wherein said controller also prevents said switched power supply from producing said power output during said times when said image processing module is processing the image.

12. An image sensor as in claim 10, wherein said switched power supply includes a charge pump.

13. An image sensor as in claim 10, wherein said power storage part stores power, and said image sensor operates based on said stored power during times when the image information is being acquired.

14. An image sensor as in claim 10, wherein said power storage part is sufficiently large to store power to operate for an entire cycle of operation of said image sensor.

15. An image sensor as in claim 13, wherein said power supply operates from said stored power for at least 10 times as long as it operates from applied power, and said power storage part is sufficiently large to store power for said time of operating from stored power.

16. An image sensor as in claim 12, wherein said charge pump includes a transistor, and a capacitor, with the transistor switching power to the capacitor.

17. An image sensor as in claim 10, wherein said image sensor includes a gamma ray sensing device.

18. An imaging module comprising:
means for detecting a signal for use in an imaging system; and
power supply means, associated with said detecting means, and generating a voltage for use by said detecting means; and
means for supplying the desired voltage for a specified period of time without simultaneously generating switching noise, and for generating said switching noise at least at one time other than said specified period.

19. A module as in claim 18, wherein said power supply means is a switching power supply.

20. A module as in claim 19, wherein said supplying means comprises a controller which turns off switching during a time of said specified period.

21. A module as in claim 18, wherein said specified period is a time during which the detecting means detects a signal.

22. A module as in claim 20, wherein said controller includes a microprocessor.

23. A module as in claim 18, wherein said controller includes discrete circuitry.

24. A module as in claim 17, wherein said power supply means includes a charge storage part, which stores power.

25. A module as in claim 18, wherein said supplying means controls said switching to be off for 10 times as long as it is on, or more.

26. A module as in claim 24, wherein said charge storage part stores power for a time long enough for said switching to be off for at least 10 times as long as it is on.

* * * * *